US011042907B1

(12) United States Patent
Mcentire et al.

(10) Patent No.: US 11,042,907 B1
(45) Date of Patent: Jun. 22, 2021

(54) MESSAGE PROCESSING SYSTEM INCLUDING CHATBOT BASED MOBILE DEVICE VIDEO MESSAGE COMMUNICATION AND RELATED METHODS

(71) Applicant: Inmar Clearing, Inc., Winston-Salem, NC (US)

(72) Inventors: O'Ryan Mcentire, Seattle, WA (US); Nathanael Georgeson, Seattle, WA (US); Jeffery Hayes, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 16/655,016

(22) Filed: Oct. 16, 2019

(51) Int. Cl.
*G06Q 30/02* (2012.01)
*G06K 7/14* (2006.01)
*H04L 12/58* (2006.01)
*H04W 4/12* (2009.01)
*H04M 1/72439* (2021.01)

(52) U.S. Cl.
CPC ....... *G06Q 30/0267* (2013.01); *G06K 7/1417* (2013.01); *H04L 51/02* (2013.01); *H04M 1/72439* (2021.01); *H04W 4/12* (2013.01)

(58) Field of Classification Search
CPC .......... G06Q 30/0267; H04M 1/72555; H04W 4/12; G06K 7/1417; H04L 51/02
USPC ........ 455/426.1; 705/14.51, 14.38, 23, 14.64
See application file for complete search history.

(56) References Cited

U.S. PATENT DOCUMENTS

| 2003/0014269 A1* | 1/2003 | Malkin ............... G06Q 30/0633 705/23 |
| 2006/0046712 A1* | 3/2006 | Shamp .................... H04W 4/12 455/426.1 |
| 2009/0014269 A1* | 1/2009 | Ari .......................... F16H 45/02 192/3.33 |

(Continued)

FOREIGN PATENT DOCUMENTS

| CN | 2784194 Y | * | 5/2006 |
| WO | 2018170876 A1 | | 9/2018 |

OTHER PUBLICATIONS

Raluca Budiu, The User Experience of Chatbots, 2018 (Year: 2018).*

*Primary Examiner* — Tarek Elchanti
(74) *Attorney, Agent, or Firm* — Allen, Dyer, Doppelt, + Gilchrist, P.A.

(57) ABSTRACT

A promotion processing system may include a first mobile wireless communications device associated with a gift giver and configured to obtain a unique identifier from a product label of a product to be gifted, and record a video message associated with the unique identifier. The system may also include a second mobile wireless communications device associated with a gift recipient and configured to obtain the unique identifier. A promotion processing server may be configured to cooperate with the first mobile wireless communications device to obtain the video message and the unique identifier, and cooperate with the second mobile wireless communications device to obtain the unique identifier. The promotion processing server may also be configured to operate a chatbot and communicate the video message within the chatbot to the second mobile wireless communications device to display the video message thereon.

17 Claims, 4 Drawing Sheets

(56) References Cited

U.S. PATENT DOCUMENTS

2010/0076836 A1* 3/2010 Giordano ............... G06Q 20/20
                                                    705/14.38
2012/0271712 A1* 10/2012 Katzin ............... G06Q 20/3274
                                                    705/14.51
2017/0295210 A1* 10/2017 Choi ................... H04L 65/1069
2018/0248817 A1* 8/2018 Licht ....................... H04L 51/02
2018/0287985 A1* 10/2018 Sabet ...................... H04L 51/26

* cited by examiner

MESSAGE PROCESSING SYSTEM INCLUDING CHATBOT BASED MOBILE DEVICE VIDEO MESSAGE COMMUNICATION AND RELATED METHODS

TECHNICAL FIELD

The present invention relates to the field of electronic messaging, and more particularly, to chatbot based messaging and related methods.

BACKGROUND

An electronic messenger program or chatbot is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A chatbot may be particularly useful for customer service or information acquisition applications.

An electronic message may be embodied in several different forms. For example, an electronic mail (email) message typically includes a message body that includes text and may include one or more attachments, for example, documents, photos, or videos. Another type of message is a short message service (SMS message) or text message, that is typically communicated among mobile devices. Images or videos may be communicated within an SMS message.

SUMMARY

A message processing system may include a first mobile wireless communications device associated with a gift giver and configured to obtain a unique identifier from a product label of a product to be gifted, and record a video message associated with the unique identifier. The system may also include a second mobile wireless communications device associated with a gift recipient configured to obtain the unique identifier. A promotion processing server may be configured to cooperate with the first mobile wireless communications device to obtain the video message and the unique identifier, and cooperate with the second mobile wireless communications device to obtain the unique identifier. The promotion processing server may also be configured to operate a chatbot and communicate the video message within the chatbot to the second mobile wireless communications device to display the video message thereon.

The message processing server may be configured to generate at least one digital promotion and communicate the at least one digital promotion to the second mobile wireless communications device. The message processing server may be configured to operate a chatbot and communicate the at least one digital promotion within the chatbot, for example. The product to be gifted may be associated with a product brand, and the at least one digital promotion may be for the product brand, for example.

The message processing server may be configured to generate and communicate at least one digital promotion to the first wireless communications device. The message processing server may be configured to generate and communicate the at least one digital promotion to the first mobile wireless communications device based upon display of the video message on the second mobile wireless communications device, for example.

The first mobile wireless communications device may include a first camera and a first controller coupled thereto and configured to obtain image data of the unique identifier from the product label. The second mobile wireless communications device may include a second camera and a second controller coupled thereto and configured to obtain image data of the unique identifier from the product label. The unique identifier comprises a quick-response (QR) code, for example.

A method aspect is directed to a method of processing a message for a gift. The method may include using a message processing server to cooperate with a first mobile wireless communications device to obtain a video message and a unique identifier associated with the video message. The first mobile wireless communications device may be associated with a gift giver and may be configured to obtain the unique identifier from a product label of a product to be gifted, and record the video message. The method may further include using the message processing server to cooperate with a second mobile wireless communications device to obtain the unique identifier. The second mobile wireless communications device may be associated with a gift recipient and configured to obtain the unique identifier. The method may also include using the message processing server to operate a chatbot and communicate the video message within the chatbot to the second mobile wireless communications device to display the video message thereon.

A computer readable medium aspect is directed to a non-transitory computer readable medium for processing a message for a gift. The non-transitory computer readable medium includes computer executable instructions that when executed by a processor cause the processor to perform operations. The operations may include cooperating with a first mobile wireless communications device to obtain a video message and a unique identifier associated with the video message. The first mobile wireless communications device may be associated with a gift giver and may be configured to obtain the unique identifier from a product label of a product to be gifted, and record a video message associated with the unique identifier. The operations may also include cooperating with a second mobile wireless communications device to obtain the unique identifier. The second mobile wireless communications device may be associated with a gift recipient and may be configured to obtain the unique identifier. The operations may further include operating a chatbot and communicating the video message within the chatbot to the second mobile wireless communications device to display the video message thereon.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
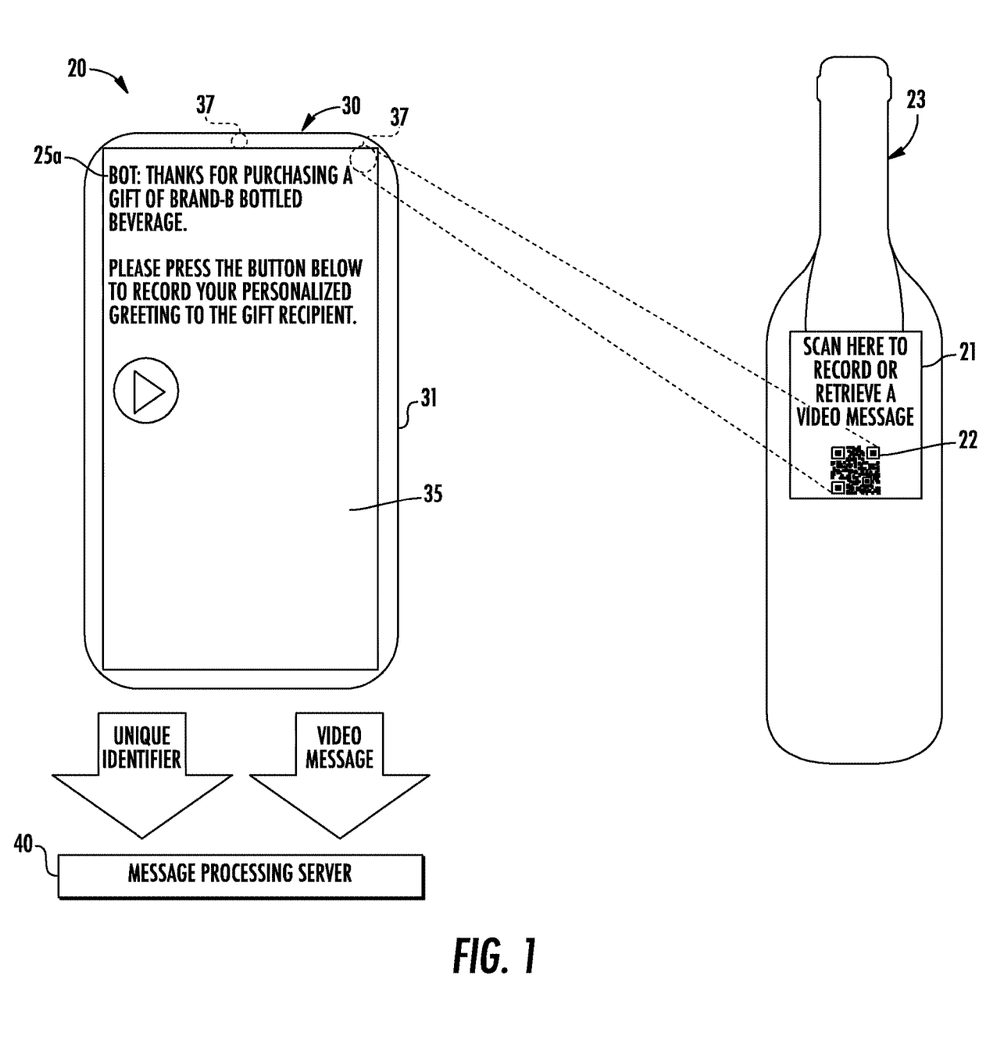
FIG. 1 is a schematic diagram of a portion of a message processing system in accordance with an embodiment.
Figure 2:
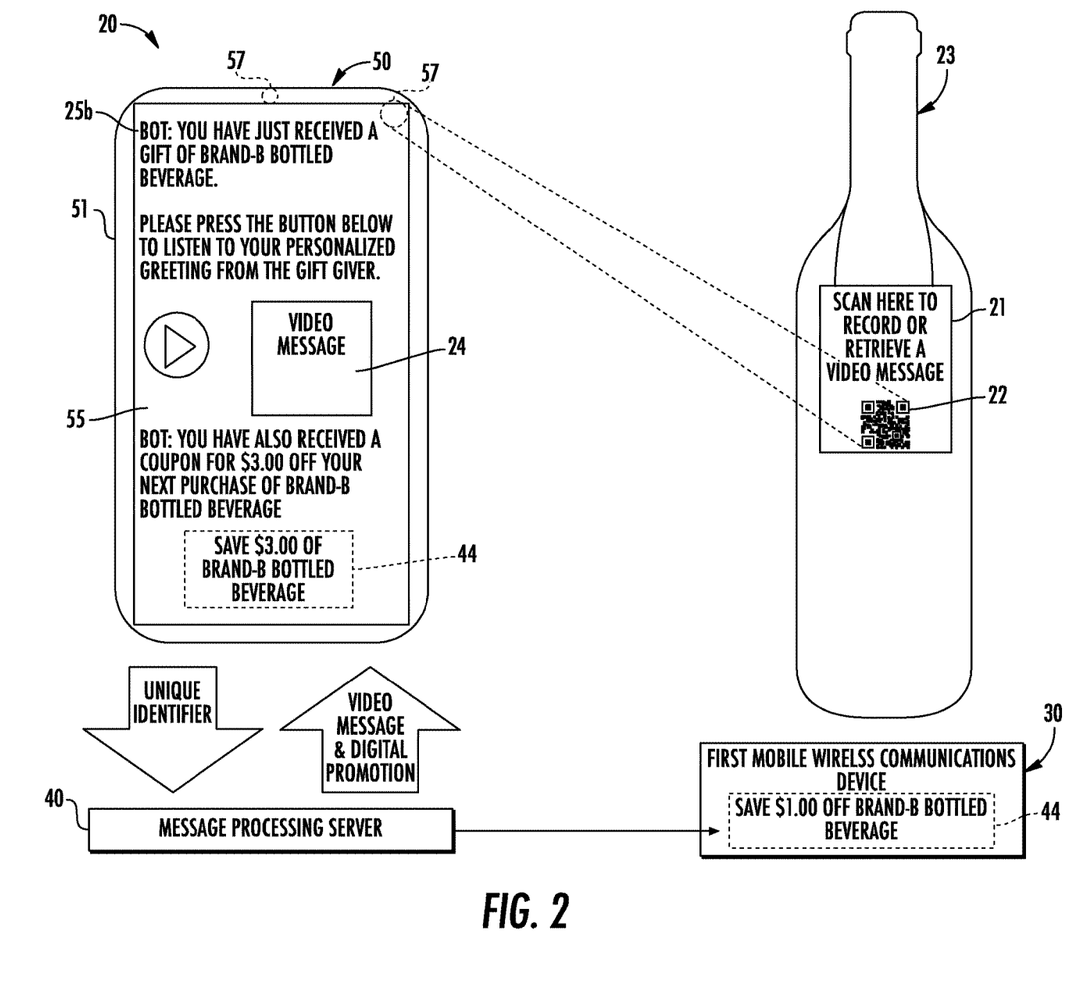
FIG. 2 is a schematic diagram of another portion of the message processing system in accordance with an embodiment.
Figure 3:
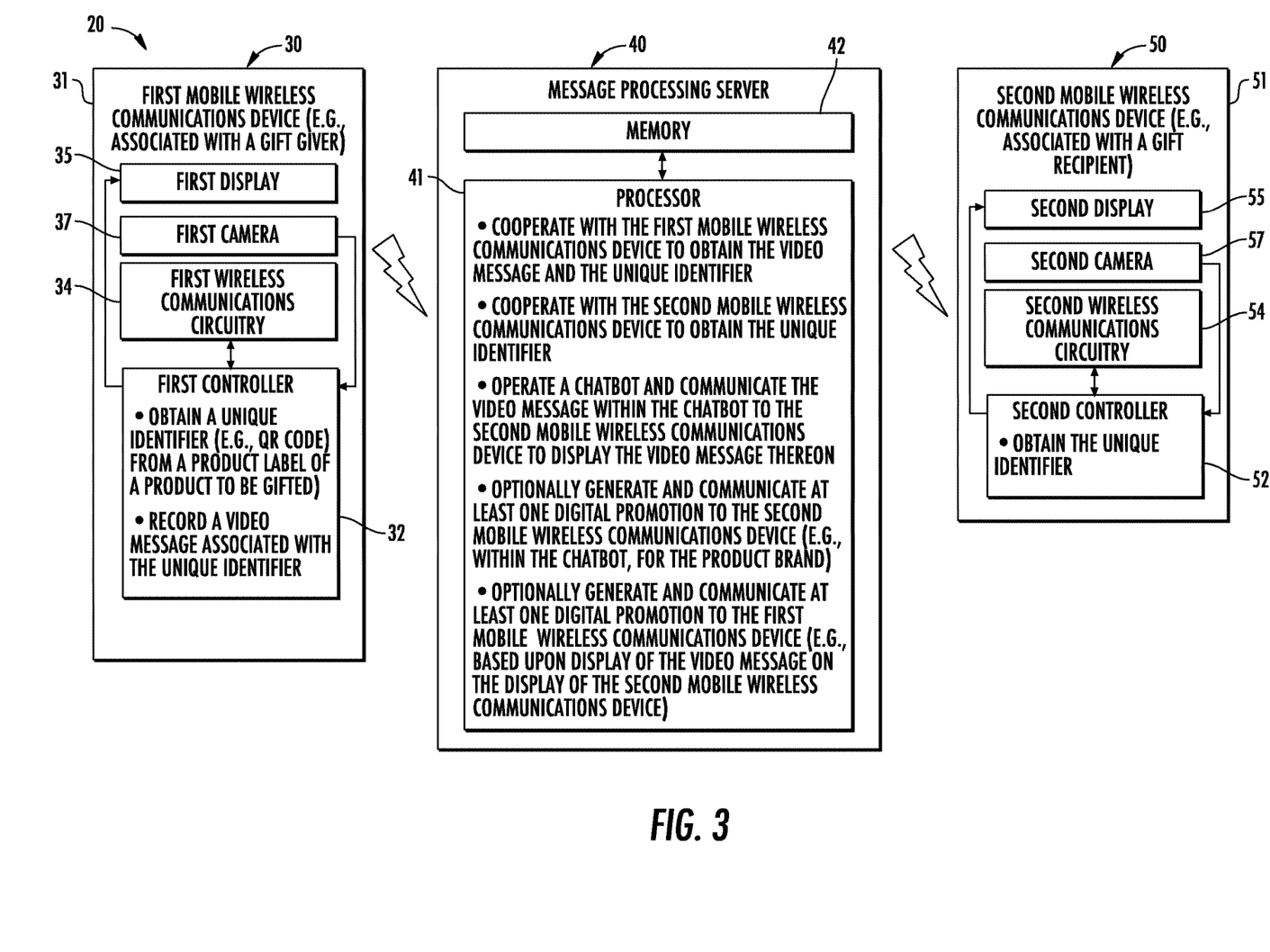
FIG. 3 is a schematic block diagram of a message processing system in accordance with an embodiment.

Referring initially to FIGS. 1-3, a system 20 for processing a message includes a first mobile wireless communications device 30 that is illustratively in the form of a mobile phone. The first mobile wireless communications device 30 is associated with a gift giver and includes a portable housing 31, a first controller 32 and first wireless communications circuitry 34 coupled to the first controller. The first mobile wireless communications device 30 also includes a first display 35, such as, for example, a touch display, carried by the portable housing 31 and coupled to the first controller 32.

The first mobile wireless communications device 30 may include one or more input devices, for example, a first camera 37 and other types of input or output devices. While a first camera 37 is described, it should be understood that the first camera may include more than one physical camera, for example, forward and rearward facing cameras as illustrated in FIG. 1. While the first mobile wireless communications device 30 is described as being a mobile phone or smartphone, those skilled in the art will appreciate that the first mobile wireless communications device may include a tablet computer, wearable device, or other type of mobile wireless communications device.

The first mobile wireless communications device 30, by way of cooperation between the first controller 32 and first camera 37, obtains a unique identifier 22 from a product label 21 of a product 23 to be gifted. More particularly, in an example implementation, as illustrated, the product 23 to be gifted may be a bottled beverage (e.g., Brand-B Bottled Beverage), and the product label 21 may be a hanging tag placed around the neck of the bottle. Of course, the product label 21 may be the label of the product itself (i.e., affixed to the bottle). The unique identifier 22 is illustratively in the form of a quick response (QR) code. The unique identifier 22 may be another type of a unique code, for example, a numerical or alphanumerical code.

With respect to the example implementation, the gift giver may operate the first mobile wireless communications device 30 to capture image data via the camera 37 of the unique identifier 22 or QR code. The first mobile wireless communications device 30, based upon the image data of the unique identifier 22 or the QR code, may open a video recording application or execute a video recording function such that the first mobile wireless communications device records a video message that is associated with the unique identifier or QR code. The video may be a "selfie" video that includes the gift giver relaying a spoken message to the desired gift recipient, for example, along the lines of a personalized spoken greeting card.

The message processing system 20 also includes a second mobile wireless communications device 50 associated with a gift recipient and that is also illustratively in the form of a mobile phone. The second mobile wireless communications device 50 includes a portable housing 51, a second controller 52 and second wireless communications circuitry 54 coupled to the second controller. The second mobile wireless communications device 50 also includes a second display 55, such as, for example, a touch display, carried by the portable housing 51 and coupled to the second controller 52. The second mobile wireless communications device 50 may include one or more input devices, for example, a second camera 57 and other types of input or output devices. While a second camera 57 is described, it should be understood that the second camera may include more than one physical camera, for example, forward and rearward facing cameras as illustrated in FIG. 2. While the second mobile wireless communications device 50 is described as being a mobile phone or smartphone, those skilled in the art will appreciate that the second mobile wireless communications device may include a tablet computer, wearable device, or other type of mobile wireless communications device.

The second mobile wireless communications device 50, by way of cooperation between the second controller 52 and second camera 57, obtains the unique identifier 22 from the product label 21 of the product 23 to be gifted, for example, upon gifting, as will be described in further detail below. More particularly, with respect to the example implementation, the second mobile wireless communications device 50 may obtain or scan the QR code or unique identifier 22 from the hanging tag 21 of the bottled beverage once gifted.

The message processing system 20 also includes a message processing server 40 communicatively coupled to the first and second mobile wireless communications devices 30, 50. The message processing server 40 includes a processor 41 and a memory 42 associated with the processor. It should be understood that while operations of the message processing server 40 are described herein, those operations are performed by way of cooperation between the processor 41 and the memory 42.

Figure 4:
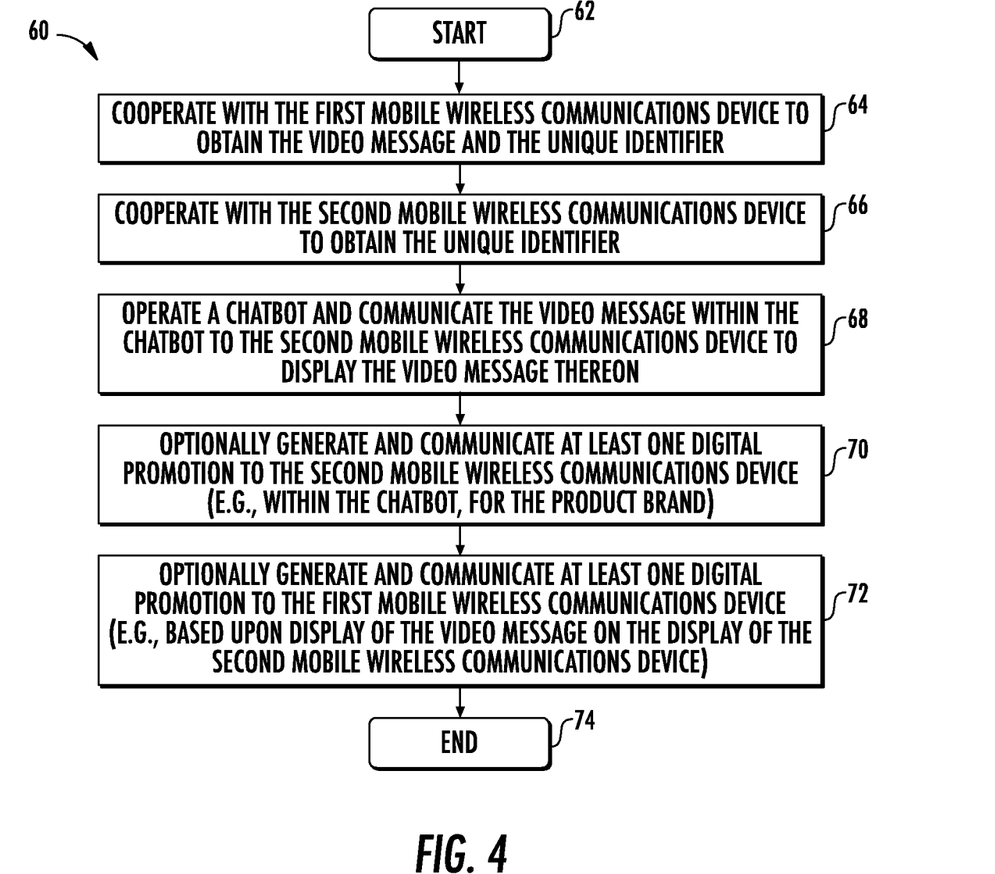
FIG. 4 is a flow diagram illustrating operation of the message processing server of the message processing system of FIG. 3.

Referring now additionally to the flowchart 60 in FIG. 4, beginning at Block 62, operations of the message processing system 20 with respect to the message processing server 40 will now be described. At Block 64, the message processing server 40 cooperates with the first mobile wireless communications device 30 to obtain the video message 24 and the unique identifier 22 (e.g., in the form of the QR code in the exemplary embodiment).

More particularly, the product 23 to be gifted may be associated with a given brand (e.g., Brand-B), and the given brand may also be associated with a chatbot 25a. Upon scanning or obtaining the unique identifier 22, or QR code as in the exemplary embodiment, a chatbot conversation with the brand chatbot 25a may be opened on the first mobile wireless communications device 30 to where the video message 24, once recorded, is loaded or communicated through. In some embodiments, a chatbot 25a may not be used with respect to the video message.

At Block 66, the message processing server 40 cooperates with the second mobile wireless communications device 50 to obtain the unique identifier 22.

The message processing server 40, at Block 68, operates a chatbot 25b and communicates the video message 24 within the chatbot to the second mobile wireless communications device 50 to display the video message thereon, for example, on the display 55 of the second mobile wireless communications device. For example, the product 23 to be gifted may be associated with a given brand, and the given brand may also be associated with the chatbot 25b. Upon scanning or obtaining the unique identifier 22, or QR code as in the exemplary embodiment, a chatbot conversation with the brand chatbot 25b may be opened on the second mobile wireless communications device 50 to display the video message 24.

The message processing server 40 may generate a digital promotion 44 and communicate the digital promotion to the second mobile wireless communications device 50 or gift recipient (Block 70). The digital promotion 44 may be communicated within the chatbot 25b. In some embodiments, the digital promotion 44 may be communicated outside of the chatbot 25b. The digital promotion 44 may be for the product brand (e.g., Brand-B), for example, in the above example implementation, toward a product of the same brand as the bottled beverage. The digital promotion 44 may be in the form of a digital coupon or a digital rebate. In some embodiments, points or rewards may be accumulated, for example, along the lines of a loyalty program, based upon gifting of the product 23 (e.g., awarded based upon recording of video message 24 and/or playback of the video message from the gift recipient).

The above described chatbots 25a, 25b may be implemented in the form of a two-way dialog box that permits the given user to communicate by way of typing (i.e., written communication). In some embodiments, the chatbots 25a, 25b may operate through voice commands or spoken words. The chatbot conversations may be inline in the social media feed or may be executed through a messenger program or application associated with the social media feed. The application or program associated with the chatbots 25a, 25b may be executed or opened, for example, based upon scanning or obtaining the unique identifier 22 or QR code.

At Block 72, the message processing server 40 may, alternatively or additionally to generating the communicating a digital promotion 44 to the second mobile wireless communications device 50 (Block 70), generate and communicate a digital promotion 44 to the first mobile wireless communications device 30. The message processing server 40 may generate and communicate the digital promotion 44 to the first mobile wireless communications device 30 based upon the video message being displayed on the display 55 of the second mobile wireless communications device 50. In other words, the message processing server 40 may communicate the digital promotion 44 to the gift giver based upon the gift recipient watching the video message 24. The digital promotion 44 may be in the form of a digital coupon or a digital rebate and may be communicated via the chatbot 25a. Operations end at Block 74.

A method aspect is directed to a method of processing a message for a gift. The method includes using a message processing server 40 to cooperate with a first mobile wireless communications device 30 to obtain a video message 24 and a unique identifier 22 associated with the video message. The first mobile wireless communications device 30 is associated with a gift giver and is configured to obtain the unique identifier 22 from a product label 21 of a product 23 to be gifted, and record the video message 24. The method further includes using the message processing server 40 to cooperate with a second mobile wireless communications device 50 to obtain the unique identifier 22. The second mobile wireless communications device 50 is associated with a gift recipient and is configured to obtain the unique identifier 22. The method also includes using the message processing server 40 to operate a chatbot 25a, 25b and communicate the video message 24 within the chatbot to the second mobile wireless communications device 50 to display the video message thereon.

A computer readable medium aspect is directed to a non-transitory computer readable medium for processing a message for a gift. The non-transitory computer readable medium includes computer executable instructions that when executed by a processor 41 cause the processor to perform operations. The operations include cooperating with a first mobile wireless communications device 30 to obtain a video message 24 and a unique identifier 22 associated with the video message. The first mobile wireless communications device 30 is associated with a gift giver and is configured to obtain the unique identifier 22 from a product label 21 of a product 23 to be gifted, and record a video message 24 associated with the unique identifier. The operations also include cooperating with a second mobile wireless communications device 50 to obtain the unique identifier 22. The second mobile wireless communications device 50 is associated with a gift recipient and is configured to obtain the unique identifier 22. The operations further include operating a chatbot 25a, 25b and communicating the video message 24 within the chatbot to the second mobile wireless communications device 50 to display the video message thereon.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A message processing system comprising:
a first mobile wireless communications device associated with a gift giver and configured to obtain a unique identifier from a product label of a product to be gifted, and to record a video message associated with the unique identifier;
a second mobile wireless communications device associated with a gift recipient configured to obtain the unique identifier; and
a message processing server configured to
obtain the unique identifier from the first wireless communications device,
operate a first chatbot to open a first chatbot conversation on the first wireless communications device based upon obtaining the unique identifier, the first chatbot conversation being in the form of a two-way dialog between the gift giver and the message processing server,
operate the first chatbot to prompt, via the first chatbot conversation, the associated gift giver to record the video message,
cooperate with the first mobile wireless communications device,
cooperate with the second mobile wireless communications device to obtain the unique identifier,
operate a second chatbot to open a second chatbot conversation on the second mobile wireless communications device based upon obtaining the unique identifier, the second chatbot conversation being in the form of a two-way dialog between the gift recipient and the message processing server,
operate the second chatbot, via the second chatbot conversation, to communicate the video message to the second mobile wireless communications device to display the video message thereon within the second chatbot conversation for playback based upon input from the gift recipient,
generate at least one digital promotion based upon the unique identifier, and operate the chatbot to communicate the at least one digital promotion to the second mobile wireless communications device within the chatbot conversation based upon playback of the video message on the second mobile wireless communications device.

2. The message processing system of claim 1 wherein the product to be gifted is associated with a product brand and wherein the at least one digital promotion is for the product brand.

3. The message processing system of claim 1 wherein the message processing server is configured to generate and communicate at least one digital promotion to the first wireless communications device.

4. The message processing system of claim 3 wherein the message processing server is configured to generate and communicate the at least one digital promotion to the first mobile wireless communications device based upon playback of the video message on the second mobile wireless communications device.

5. The message processing system of claim 1 wherein the first mobile wireless communications device comprises a first camera and a first controller coupled thereto and configured to obtain image data of the unique identifier from the product label.

6. The message processing system of claim 1 wherein the second mobile wireless communications device comprises a second camera and a second controller coupled thereto and configured to obtain image data of the unique identifier from the product label.

7. The message processing system of claim 1 wherein the unique identifier comprises a quick-response (QR) code.

8. A message processing server comprising:
a processor and an associated memory configured to
obtain a unique identifier associated with a video message from a first wireless communications device, the first mobile wireless communications device associated with a gift giver and configured to obtain the unique identifier from a product label of a product to be gifted, and record the video message,
operate a first chatbot to open a first chatbot conversation on the first wireless communications device based upon obtaining the unique identifier, the first chatbot conversation being in the form of a two-way dialog between the gift giver and the message processing server,
operate the first chatbot to prompt, via the first chatbot conversation, the associated gift giver to record the video message,
cooperate with the first mobile wireless communications device to obtain the video message
cooperate with a second mobile wireless communications device to obtain the unique identifier, the second mobile wireless communications device associated with a gift recipient,
operate a second chatbot to open a second chatbot conversation on the second mobile wireless communications device based upon obtaining the unique identifier, the second chatbot conversation being in the form of a two-way dialog between a gift recipient and the message processing server,
operate the second chatbot, via the second chatbot conversation, to communicate the video message to the second mobile wireless communications device to display the video message thereon within the second chatbot conversation for playback based upon input from the gift recipient,
generate at least one digital promotion based upon the unique identifier, and
operate the chatbot to communicate the at least one digital promotion to the second mobile wireless communications device within the chatbot conversation based upon playback of the video message on the second mobile wireless communications device.

9. The message processing server of claim 8 wherein the product is associated with a product brand and wherein the at least one digital promotion is for the product brand.

10. The message processing server of claim 8 wherein the processor is configured to generate and communicate at least one digital promotion to the first wireless communications device.

11. The message processing server of claim 10 wherein the processor is configured to generate and communicate the at least one digital promotion to the first mobile wireless communications device based upon playback of the video message on the second mobile wireless communications device.

12. A method of processing a message for a gift, comprising:
using a message processing server to
obtain a unique identifier associated with a video message from a first wireless communications device, the first mobile wireless communications device associated with a gift giver and configured to obtain the unique identifier from a product label of a product to be gifted, and record the video message,
operate a first chatbot to open a first chatbot conversation on the first wireless communications device based upon obtaining the unique identifier, the first chatbot conversation being in the form of a two-way dialog between the gift giver and the message processing server,
operate the first chatbot to prompt, via the first chatbot conversation, the associated gift giver to record the video message,
cooperate with the first mobile wireless communications device to obtain the video message,
cooperate with a second mobile wireless communications device to obtain the unique identifier, the second mobile wireless communications device associated with a gift recipient,
operate a second chatbot to open a second chatbot conversation on the second mobile wireless communications device based upon obtaining the unique identifier, the second chatbot conversation being in the form of a two-way dialog between a gift recipient and the message processing server,
operate the second chatbot, via the second chatbot conversation, to communicate the video message to the second mobile wireless communications device to display the video message thereon within the second chatbot conversation for playback based upon input from the gift recipient,
generate at least one digital promotion based upon the unique identifier, and
operate the chatbot to communicate the at least one digital promotion to the second mobile wireless communications device within the chatbot conversation based upon playback of the video message on the second mobile wireless communications device.

13. The method of claim 12 wherein using the message processing server comprises using the message processing server to generate and communicate at least one digital promotion to the first wireless communications device.

14. The method of claim 13 wherein using the message processing server comprises using the message processing server to generate and communicate the at least one digital promotion to the first mobile wireless communications device based upon playback of the video message on the second mobile wireless communications device.

15. A non-transitory computer readable medium for processing a message for a gift, the non-transitory computer readable medium comprising computer executable instructions that when executed by a processor cause the processor to perform operations comprising:

obtaining a unique identifier associated with a video message from a first wireless communications device, the first mobile wireless communications device associated with a gift giver and configured to obtain the unique identifier from a product label of a product to be gifted, and record the video message;

operating a first chatbot to open a first chatbot conversation on the first wireless communications device based upon obtaining the unique identifier, the first chatbot conversation being in the form of a two-way dialog between the gift giver and the message processing server;

operating the first chatbot to prompt, via the first chatbot conversation, the associated gift giver to record the video message;

cooperating with the first mobile wireless communications device to obtain the video message;

cooperating with a second mobile wireless communications device to obtain the unique identifier, the second mobile wireless communications device associated with a gift recipient;

operating a second chatbot to open a second chatbot conversation on the second mobile wireless communications device based upon obtaining the unique identifier, the second chatbot conversation being in the form of a two-way dialog between a gift recipient and the message processing server;

operating the second chatbot, via the second chatbot conversation, for communicating the video message to the second mobile wireless communications device to display the video message thereon within the second chatbot conversation for playback based upon input from the gift recipient;

generating at least one digital promotion based upon the unique identifier; and operating the chatbot to communicate the at least one digital promotion to the second mobile wireless communications device within the chatbot conversation based upon playback of the video message on the second mobile wireless communications device.

16. The non-transitory computer readable medium of claim 15 wherein the operations comprise generating and communicating at least one digital promotion to the first wireless communications device.

17. The non-transitory computer readable medium of claim 16 wherein the operations comprise generating and communicating the at least one digital promotion to the first mobile wireless communications device based upon playback of the video message on the second mobile wireless communications device.

* * * * *